(12) United States Patent
Lazier

(10) Patent No.: US 10,795,740 B2
(45) Date of Patent: *Oct. 6, 2020

(54) PARAMETER DELEGATION FOR ENCAPSULATED SERVICES

(71) Applicant: Amazon Technologies, Inc., Seattle, WA (US)

(72) Inventor: Colin Laird Lazier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/640,894

(22) Filed: Jul. 3, 2017

(65) Prior Publication Data

US 2017/0308419 A1 Oct. 26, 2017

Related U.S. Application Data

(63) Continuation of application No. 14/133,580, filed on Dec. 18, 2013, now Pat. No. 9,697,061.

(51) Int. Cl.
*G06F 9/54* (2006.01)

(52) U.S. Cl.
CPC .................... *G06F 9/547* (2013.01)

(58) Field of Classification Search
CPC . G06F 9/54; G06F 9/541; G06F 9/547; H04L 29/06047
See application file for complete search history.

(56) References Cited

U.S. PATENT DOCUMENTS

| | | |
|---|---|---|
| 6,634,887 B1 | 10/2003 | Heffernan, III et al. |
| 8,296,434 B1 | 10/2012 | Miller et al. |
| 8,843,600 B1 * | 9/2014 | Gabrielson ......... H04L 41/0806 709/220 |
| 9,697,061 B1 | 7/2017 | Lazier |
| 2003/0188039 A1 | 10/2003 | Liu et al. |
| 2004/0024841 A1 | 2/2004 | Becker et al. |
| 2004/0064411 A1 * | 4/2004 | Tsui .................. G06Q 30/06 705/40 |
| 2005/0154873 A1 | 7/2005 | Cam-Winget et al. |

(Continued)

*Primary Examiner* — Umut Onat

(74) *Attorney, Agent, or Firm* — Robert C. Kowert; Kowert, Hood, Munyon, Rankin & Goetzel, P.C.

(57) ABSTRACT

A service provider system may provide virtualized computing services to clients, including encapsulating services that call other (encapsulated) services. Once configured to delegate parameters to encapsulated services, an encapsulating service (and its API) may not need to be modified when an encapsulated service (or its API) is modified to support more, fewer, or different features or corresponding arguments. For example, an encapsulating service may receive a service request call from a client that includes arguments for an encapsulated service (e.g., as header information, or as an opaque block or uninterpreted key-value dictionary) and may call the encapsulated service, blindly passing along those arguments. An encapsulating service may access stored policy-based arguments or obtain arguments from a central service. Arguments passed to an encapsulated service may override default parameters of the service. An encapsulating service may blindly proxy responses received from an encapsulated service to a client.

20 Claims, 9 Drawing Sheets

(56) References Cited

U.S. PATENT DOCUMENTS

| | | | |
|---|---|---|---|
| 2005/0210281 A1* | 9/2005 | Enomoto | G06F 16/335 |
| | | | 726/22 |
| 2005/0238049 A1 | 10/2005 | Delregno | |
| 2006/0095576 A1* | 5/2006 | Perry | H04L 67/02 |
| | | | 709/227 |
| 2007/0276717 A1 | 11/2007 | Alburey et al. | |
| 2008/0134016 A1* | 6/2008 | Niemoller | G06F 16/30 |
| | | | 715/234 |
| 2011/0167432 A1 | 7/2011 | Xie et al. | |
| 2011/0252154 A1 | 10/2011 | Bunch et al. | |
| 2012/0159643 A1 | 6/2012 | Bradley et al. | |
| 2012/0290541 A1 | 11/2012 | Anderson et al. | |
| 2013/0198113 A1 | 8/2013 | Ray et al. | |
| 2013/0198611 A1 | 8/2013 | Laurent et al. | |
| 2013/0311553 A1 | 11/2013 | Lu et al. | |
| 2014/0082695 A1 | 3/2014 | Alsina et al. | |
| 2015/0103827 A1* | 4/2015 | Quinn | H04L 45/74 |
| | | | 370/392 |

\* cited by examiner

PARAMETER DELEGATION FOR ENCAPSULATED SERVICES

This application is a continuation of U.S. patent application Ser. No. 14/133,580, filed Dec. 18, 2013, now U.S. Pat. No. 9,697,061, which is hereby incorporated by reference herein in its entirety.

BACKGROUND

Several leading technology organizations are investing in building technologies that sell "software-as-a-service". Such services provide access to shared storage (e.g., database systems or storage systems that provide archival storage) and/or computing resources to clients, or subscribers. Within multi-tier e-commerce systems, different resources may be allocated to subscribers and/or their applications from whole machines, to CPU, to memory, to network bandwidth, and to I/O capacity.

Some services that are exposed to clients or subscribers call other services that are internal to the service provider. Often, this is unknown to the clients or subscribers, and features of the underlying services are not exposed to the clients or subscribers. When services encapsulate other services on behalf of a client, this can be restricting and can lead to a complexity explosion in the encapsulating service. For example, in systems in which features of an underlying service are exposed to clients or subscribers of an external (client-facing) service, any modification to the application programming interface (API) of the underlying service typically requires a corresponding modification to any and all external (client-facing) services that are configured to call the underlying service and their APIs.

Figure 1:
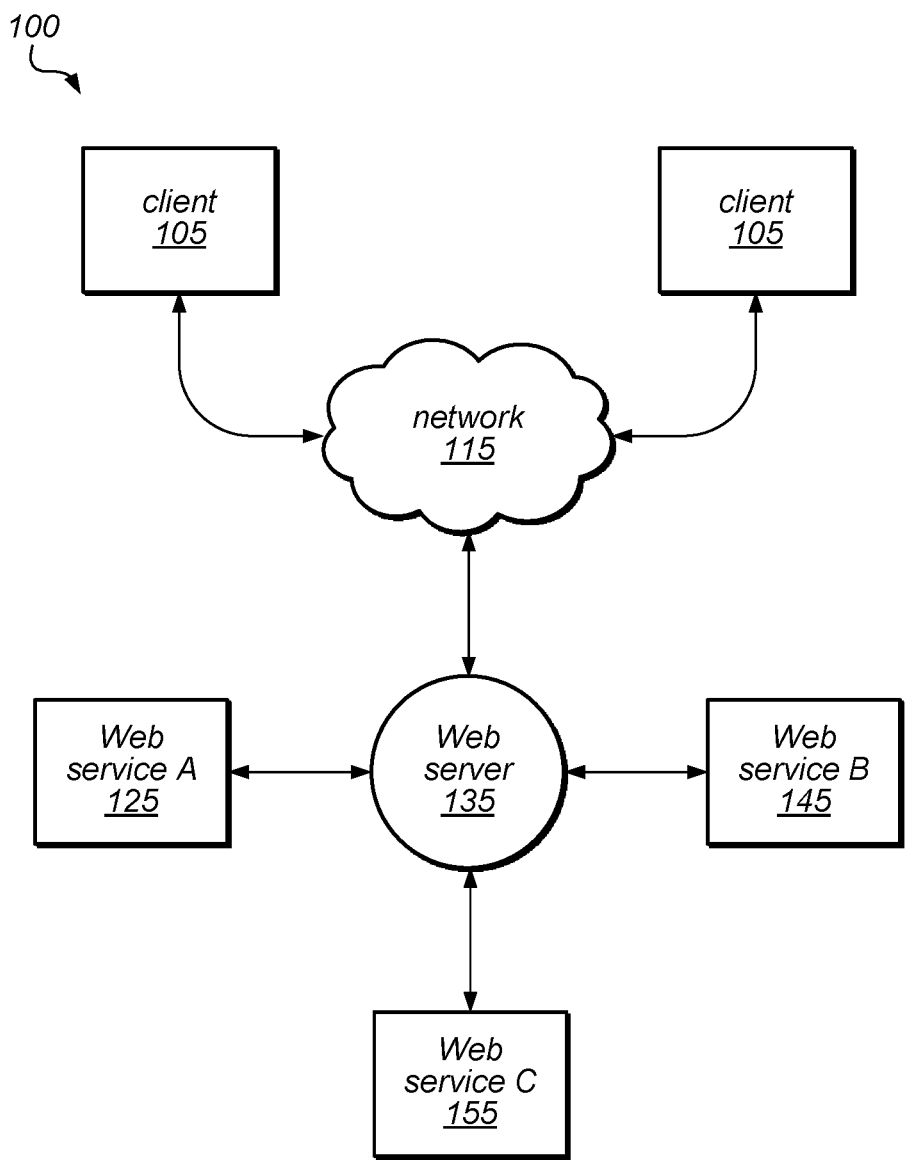
FIG. 1 is a block diagram illustrating one embodiment of a system that provides various Web-based services to clients.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

In some embodiments, the service provider systems described herein may provide virtualized, Web-based computing services (e.g., storage services and/or computational services) to clients (e.g., client applications, users, or subscribers having access to the services). Some of the services may be encapsulating (or calling) services that call other (encapsulated) services, sometimes referred to herein as "underlying services". In various embodiments, any or all of the encapsulating services and/or the encapsulated services may be public-facing services that can be independently and individually accessed by clients. As described in more detail herein, the encapsulating services may be configured to delegate to other sources various parameters of encapsulated services that are not interpreted by the encapsulating service and that may not even be visible to, readable by (e.g., able to be parsed by), or understandable to the encapsulating service.

Once configured to delegate parameters of encapsulated services to other sources (e.g., sources other than the input parameters of the encapsulating services), an encapsulating service (and its API) may not need to be modified when an encapsulated service (or its API) is modified to support more, fewer, different, or modified features or functions and their corresponding arguments. In some embodiments, an encapsulating service may receive a service request call from a client that includes arguments for an encapsulated service that are that are defined by an API of the encapsulated service, that are not defined by the API of the encapsulating service, and that are not interpreted by the encapsulating service. For example, the arguments may be included in the service request call as header information formatted in accordance with a header format that is designated for arguments of encapsulated services, as an opaque block, or as an uninterpreted key-value dictionary, and the encapsulating service may be configured to call the encapsulated service, blindly passing along those arguments.

By supporting mechanisms for parameter delegation, the systems described herein may allow customers to be able to take advantage of one or more features (e.g., optional features or configurable features) of underlying (encapsulated) services without the encapsulating service needing to understand, interpret, or take action in response to receiving arguments that invoke, configure, and/or control those features. In other words, the systems described herein may expose various features of an internal or underlying service of a service provider to a client at the external interface of a calling (encapsulating) service without the calling (encapsulating) service needing to understand those features or any changes made to those features.

In some embodiments, instead of (or in addition to) extracting arguments for an underlying (encapsulated) service from within a service request call received by an encapsulating service, an encapsulating service may access stored policy-based arguments for an encapsulating service or may obtain such arguments from a centralized service. In some embodiments, one or more arguments passed to an encapsulated service by an encapsulating service may override default parameters of the encapsulated service. In addition, an encapsulating service may blindly proxy responses received from an encapsulated service back to the client on whose behalf the encapsulated service was called by the encapsulating service.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 1 is a block diagram illustrating a system that provides various Web-based services to clients, according to one embodiment. In this example, system 100 includes one or more clients 105. In this example, the clients 105 may be configured to interact with a Web server 135 via a communication network 115.

As illustrated in this example, the Web server 135 may be configured to process requests from clients 105 for various services, such as Web service A (125), Web service B (145), and Web service C (155), and to return results to the clients 105. Each of these Web-based services may provide clients with one or more of: computational resources, database services, data storage services (e.g., maintaining data in one or more tables on behalf of a client), or any other types of services or shared resources.

As noted above, a service provider system may provide different types of services to clients, and some of these services may be configured to call other ones of the services as part of fulfilling (or at least attempting to fulfill) a service request that was received from a client. As described herein, at least some of these encapsulating services may be configured to delegate client-specified arguments of one or more encapsulated services (e.g., arguments that are received within service request calls from a client but are not interpreted as input parameters of the encapsulating service, or arguments that are otherwise obtained by the encapsulating service from another source). In some embodiments, an encapsulating service may be configured to delegate parameters to an external service (e.g., a service that is not hosted on the same service provider network or platform that hosts the encapsulating service). In other embodiments, a client application may be configured to act as an encapsulating service, calling one or more encapsulated services and, in some cases, blindly passing along arguments to those services that are embedded in service request calls but are not interpreted as input parameters of the encapsulating service.

Figure 2:
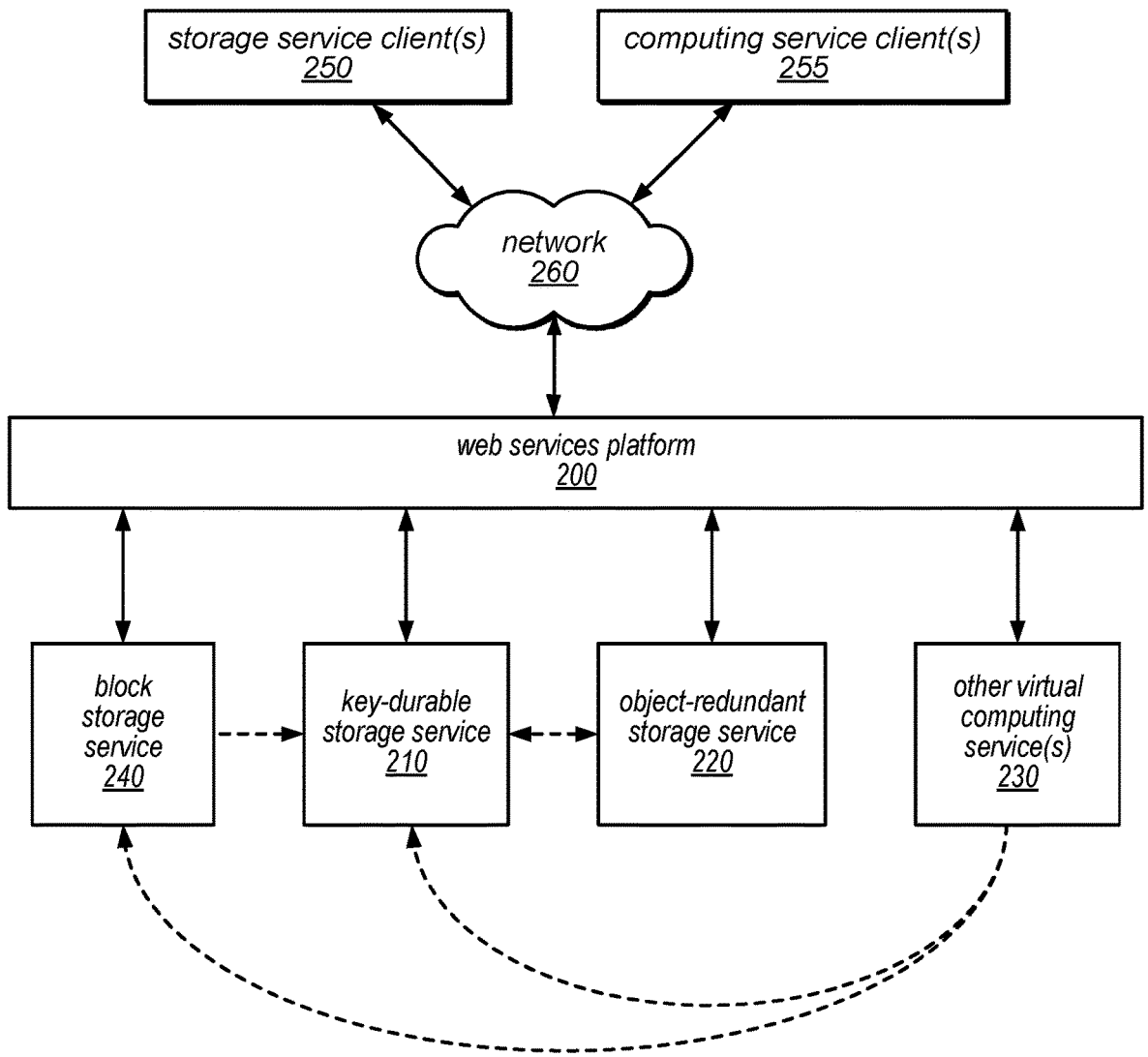
FIG. 2 is a block diagram illustrating one embodiment of a system architecture that is configured to implement Web-based services, including encapsulating services.

One embodiment of a service system architecture that may be configured to implement various Web-based services, including encapsulated services, is illustrated by the block diagram in FIG. 2. In the illustrated embodiment, a number of clients (shown as storage clients 250 and computing service clients 255) may be configured to interact with a web services platform 200 via a network 260. In this example, web services platform 200 may be configured to interface with one or more instances of a key-durable storage service 210, an object-redundant storage service 220, a block storage service 240, and/or other virtual computing services 230 (which may include computational services). It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as the computer system embodiment shown in FIG. 9 and discussed below. In various embodiments, the functionality of a given service system component may be implemented by a particular node or distributed across several nodes. In some embodiments, a given node may implement the functionality of more than one service system component (e.g., more than one storage service system component and/or more than one computing service system component).

Generally speaking, clients 250 and/or 255 may encompass any type of client configurable to submit web services requests to web services platform 200 via network 260, including requests for storage services and/or computing services. For example, a given client 250 or 255 may include a suitable version of a web browser, or a plugin module or other type of code module configured to execute as an extension to or within an execution environment provided by a web browser. Alternatively, a client (e.g., a storage service client 250 or computing service client 255) may encompass an application such as a database application, media application, office application or any other application that may make use of persistent storage resources or virtualized computing resources. In some embodiments, such an application may include sufficient protocol support (e.g., for a suitable version of Hypertext Transfer Protocol (HTTP)) for generating and processing web services requests without necessarily implementing full browser support for all types of web-based data. That is, a client 250 may be an application configured to interact directly with web services platform 200. As described herein, a client 250 or 255 may be configured to generate web services requests according to a Representational State Transfer (REST)-style web services architecture, a document- or message-based web services architecture, or another suitable web services architecture.

In some embodiments, a client (e.g., a storage service client 250) may be configured to provide access to web services-based storage to other applications in a manner that is transparent to those applications. For example, a client 250 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, the details of interfacing to web services platform 200 may be coordinated by client 250 and the operating system or file system on behalf of applications executing within the operating system environment.

Clients 250 and/or 255 may convey web services requests to and receive responses from web services platform 200 via network 260. In various embodiments, network 260 may encompass any suitable combination of networking hardware and protocols necessary to establish web-based communications between clients 250 and/or 255 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 (or 255) and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 (or 255) and the Internet as well as between the Internet and web services platform 200. It is noted that in some embodiments, clients 250 and/or 255 may communicate with web services platform 200 using a private network rather than the public Internet. For example, clients 250 and/or 255 may be provisioned within the same enterprise as a storage service system (e.g., a system that implements key-durable storage service 210, object-redundant storage service 220, and/or block storage service 240) or a system that implements computational services (e.g., a system that implements one or more other virtual computing services 230). In such a case, clients 250 and/or 255 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests received from clients 250 and/or 255. For example, web services platform 200 may include hardware and/or software configured to implement a particular endpoint, such that an HTTP-based web services request directed to that endpoint is properly received and processed. In one embodiment, web services platform 200 may be implemented as a server system configured to receive web services requests from clients 250 and/or 255 and to forward them to components of a system that implements key-durable storage service 210, object-redundant storage service 220, block storage service 240 and/or other virtual computing service(s) 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage and/or computing resources, such as by tracking the identities of requesting clients, the number and/or frequency of client requests, the size of objects stored or retrieved on behalf of clients, overall storage bandwidth used by clients, class of storage requested by clients, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of service system operational metrics, such as metrics reflecting the rates and types of requests received from clients 250, bandwidth utilized by such requests, system processing latency for such requests, system component utilization (e.g., network bandwidth, processor utilization, and/or storage utilization within the service system), rates and types of errors resulting from requests, characteristics of storage objects (e.g., size, data type, etc.), or any other suitable metrics. In some embodiments such metrics may be used by system administrators to tune and maintain system components, while in other embodiments such metrics (or relevant portions of such metrics) may be exposed to clients 250 or 255 to enable such clients to monitor their usage of key-durable storage services 210, object-redundant storage service 220, block storage 240, and/or other virtual computing services 230 (or the underlying systems that implement those services). In some embodiments, platform 200 may also implement user authentication and access control procedures.

It is also noted that while web services platform 200 may represent the primary interface through which clients 250 or 255 may access the features of a service system that implements one or more of the services illustrated in FIG. 2, it need not represent the sole interface to such features. For example, an alternate API that may be distinct from a web services interface may be used to allow clients internal to the enterprise providing the service system to bypass web services platform 200. As illustrated by the dashed lines between key-durable storage service 210 and object-redundant storage service 220, and between key-durable storage service 210 and block storage service 240 in FIG. 2, two different services may be configured to bypass web services platform 200 and to implement an API directly between the two underlying systems. For example, key-durable storage service 210 and object-redundant storage service 220 may be configured to work together to provide a cost-efficient but highly durable storage solution for clients. Additional examples of the use of such configurations are described in more detail below. In another example, one of the virtual computing services 230 (e.g., one that provides computational services) may configured to bypass web services platform 200 and to implement an API directly between the virtual computing service 230 and a storage system (e.g., key-durable storage service 210 and/or block storage service 240) to store objects used in performing computational services on behalf of a client. In some cases, the accounting and/or credentialing services of platform 200 may be unnecessary for internal clients such as administrative clients or between service components within the same enterprise.

Note that in various embodiments, different storage policies may be implemented by key-durable storage service 210, object-redundant storage service 220, and block storage service 240. Examples of such storage policies may include durability policy (e.g., a policy indicating the number of instances of an object or a key that will be stored and the number of different nodes on which they will be stored), a locality policy (e.g., a policy giving preference to storage nodes in a same region or area as a client) and/or a load balancing policy (which may distribute stored objects and keys across different nodes, volumes and/or disks in an attempt to equalize request traffic). For example, in some embodiments, a key-durable storage service 210 may implement a lower-durability storage policy for objects than is implemented in an object-redundant storage service 220. In addition, different storage policies may be applied to different items by one of the storage services. For example, in some embodiments, a key-durable storage service 210 may implement a higher durability for keys than for objects.

In some embodiments a key-durable storage service 210 may be a Web-based service exposed to storage service clients, in other embodiments, the key-durable storage service 210 may be internal to a computing system or an enterprise system and may not be exposed to external clients (e.g., users or client applications). For example, a client may store objects to a primary storage service (a storage service other than a key-durable storage service), and the primary storage service or an operating system (or another system component) may cause the object (or a replica or shard thereof) to be stored to a key-durable storage service instead of or in addition to storing the object to the primary storage service. In another example, the operating system, a backup process, or another system component may back up a primary storage system (e.g., periodically, automatically or in response to a request to do so) to a key-durable storage system. In these examples, the "client" of key-durable storage service 210 may be another storage service (such as object-redundant storage service 220 or block storage service 240 illustrated in FIG. 2) or another application internal to a web services platform (such as one of the other virtual computing services 230 illustrated in FIG. 2). In such embodiments, the client may access key-durable storage service 210 over a local or private network, rather than over the Internet. Similarly, a virtual computing service 230 (e.g., one that provides computational services) may be an internal client of a block storage service 240, or a key-durable storage service 210 may be an internal client of an object-redundant storage service 220, in different embodiments. In some embodiments, these internal clients may be thought of as encapsulating services that call other (underlying) services on behalf of clients in order to fulfill (or at least attempt to fulfill) particular requests for service received from those clients.

In some embodiments, an encapsulated service (and/or the service provider system on which it is hosted) may support a variety of features and/or functions, some of which may be selectable or configurable through various input parameters (arguments) o the calls that invoke them. For example, the APISs of various encapsulated storage services and/or computational services may define arguments through which the client can specify one or more of: a storage class, a processor class, a performance class, a redundancy option, a durability model, a consistency model, a throughput option, a security option, an encryption type, a data versioning option, a lifecycle parameter, a tenancy option, a locality policy, a retention policy, a load balancing policy, or any other type of function-specific parameter or service level agreement parameter of the encapsulated service. The systems described herein may include mechanisms for delegating the parameters of an encapsulated service (e.g., to sources other than the input parameters of the encapsulating services) that, once configured, allow a client on whose behalf an encapsulated service is called by an encapsulating service (e.g., an encapsulating service that was called by the client) to be able to specify some or all of the arguments supported by the encapsulated service, even if they change over time, without needing to modify the APIs of all of the encapsulating services that can call them.

As noted above, in some embodiments, one or more of the services offered to clients by a service provider (sometimes referred to herein as client-facing, or external-facing services) may be configured to call or to be called by other ones of these client-facing services. Often this is done in a way in which a client-facing service X uses a client-facing service Y in fulfilling service requests received from clients, but the end users may need not ever know or care that service Y is being used by service X. For example, a first storage service may use a second storage service to store metadata or as a backup storage service when operating to provide services to end users, but this may be unknown and irrelevant to the end users of the first storage service. In this case, the features of the second storage may be changed over time without affecting the end user, or the storage service that is called by the first storage system may be used to store metadata or as a backup storage service may be swapped out for another storage service by the service provider without the knowledge of the end users of the first storage service and without affecting the end users.

In another example, however, the storage system used internally by a service provider for backing up a client-facing storage service may be relevant to the end users of the client-facing storage service. For example, if snapshots taken by a client-facing block storage service (such as block storage service 240 in FIG. 2) at the request of a client (e.g., using a "create snapshot" API) are (internally) stored in a key-durable storage service that may be client-facing under other circumstances and that may have a higher durability model than the block storage service (such as key-durable storage service 210 in FIG. 2), the end users may want to know this so that they can know the durability model used when storing snapshots of their data (which may affect the pricing they receive for the use of the block storage service). In this example, the end users may want to be able to select the durability model used when storing snapshots of their data, and/or other parameters of the key-durable storage service (e.g., a data versioning option, a redundancy option such as standard storage or reduced redundancy storage, or encryption type such as whether or not to apply server-side encryption to the snapshot data). In another example, client-facing key-durable storage service (such as key-durable storage service 210 in FIG. 2) may (internally) use a second storage service (e.g., a storage service such as object-redundant storage service 220 in FIG. 2) for archival storage, and the end users of the client-facing key-durable storage service may want to know this so that they can know, and may even be able to select, various parameters of the archival storage of its data (e.g., a retention policy, lifecycle parameter, or storage class).

As noted above, when the services implemented in some service provider systems encapsulate other services on behalf of a client, this can be restricting and can lead to a complexity explosion in the encapsulating services. For example, if the service provider systems allow some or all of the options that would typically be available to end users when an encapsulated service is offered as a client-facing service to be exposed directed through the APIs of all other services that encapsulate that service, this may not only add complexity to the APIs of the encapsulating services but may also couple various combinations of services indefinitely, such that any time a new feature or option is introduced into the encapsulated service (e.g., in a newly released version of the encapsulated service), all of the services that encapsulate that service would need to add the appropriate options to their APIs, as well. Similarly, if a feature or option is dropped from an encapsulated service or its API is otherwise changed, all of the services that encapsulate that service would need to modify their APIs and/or the ways that the input parameter are parsed, interpreted, or otherwise handled in the encapsulated service. For example, the encapsulating services may need to be modified to recognize now invalid arguments or combinations of arguments and to respond accordingly.

In some embodiments, the service provider systems described herein may allow for at least some arguments of an encapsulated service to be delegated to another source (e.g., a source other than the input parameters of the encapsulating service), using any of a variety of delegation mechanisms, including, but not limited to, those described herein. For example, in some embodiments, an encapsulating service may proxy an opaque payload (e.g., one that includes client-specified arguments for an encapsulated service and that is formatted, packed, and/or encrypted in such a way that these arguments are not visible, parsable, or understandable by the encapsulating service) from the client through itself to another (encapsulated) service. In this example, the receiving (encapsulated) service may then unpack, parse, and/or decrypt that opaque payload and use any arguments of the receiving service that were included in the opaque payload to override some or all of the arguments in the service request call made by the encapsulating service with the contents of that payload (e.g., default or policy-based parameters that were included in the service request call by the encapsulating service). Alternately, an encapsulated service may be configured to look up or obtain one or more appropriate overrides from a centralized service or within stored policy information that it maintains itself (e.g., within a data structure or file in which arguments for encapsulated services are associated with identifiers of customers, end users, or other distinguishing tags or characteristics of the service request calls that it expects to receive).

In some embodiments, if and when an encapsulated service introduces a new feature or option, rather than making a change to the encapsulating service(s) and/or their APIs to support the new functionality, the service provider may only need to modify the delegation mechanism (e.g., the policy information or payloads described above) so that they may serve as a source of arguments when an encapsulating service wishes to access the new functionality (e.g., on behalf of the client, using client-specified arguments). Note that, in various embodiments, the payload containing client-specified arguments that may be proxied through a chain of service request calls may or may not be opaque. However the use of an opaque block in which to pass arguments for an encapsulated service may be suitable in situations in which there is a third party intermediary (one that performs proxying, as described herein) that is not trusted by the client or the service provider, or in situations in which an intermediary is not authorized to view or modify the arguments for the encapsulated service in flight (e.g., to avoid exposing key-value pairs that might reveal features or details about the encapsulated service that are not intended to be shared with that intermediary).

Note also that in different embodiments, all or only a particular subset of the input parameters of a service that is (internally) encapsulated by another service by the service provider may be able to be specified and/or its defaults overridden by client-specified arguments, as described herein. In other embodiments, some or all of the input parameters of an encapsulated service may be restricted (e.g., by the service provider, customer, or end user) from being overridden at certain times or under certain conditions or by default. In some embodiments, once an argument is overridden by a client-specified argument, the client-specified argument may become a new default argument for the encapsulated service, and may be applied to subsequent service request calls that are directed to the encapsulated service by the encapsulating service and/or by other clients. In other embodiments, client-specified arguments may override default or policy-based arguments only when servicing the particular request call associated with the client-specified arguments (e.g., on a request-by-request basis). In some embodiments, the parameter delegation techniques described herein may provide an elegant way to tie disparate services together in a service platform without contributing a prohibitive amount of complexity to the encapsulating services.

In some embodiments, the systems described herein may support an option for a client to include information about (or for) an encapsulated service in a service request sent to an encapsulating service that is intended for at least partial interpretation by the encapsulating service. For example, the systems described herein may support an option for a client to specify an endpoint to which an additional service request should be directed by an encapsulating service or a particular underlying service to be called by an encapsulating service when the encapsulating service is attempting to fulfill a service request received from (or on behalf of) the client. In some embodiments, there may be multiple services available for an encapsulating service to use in fulfilling service requests that perform similar functions (e.g., multiple storage services or multiple services that provide computational resources), and a client may include information in a service request sent to the encapsulating service indicating which of the available services should be called by the encapsulating service (e.g., by specifying an endpoint to which a service request should be directed and/or the preferred service itself). In other words, the client may be able to specify that a preferred underlying service should be selected from among the options available to the encapsulated service when servicing a request received from the client. In one specific example, a client may be able to select one of multiple available storage services as the service to be called by the encapsulating service in response to a service request to create a snapshot of data being maintained or managed by the encapsulating service.

In some embodiments, if a client-specified endpoint and/or service is indicated in a service request sent to an encapsulating service by a client, this information may override a default endpoint and/or underlying service that would have been utilized by the encapsulating service absent the inclusion of this information in the service request (if, in fact, the information indicates that an endpoint and/or service other than the default endpoint and/or service is preferred or required by the client). In such embodiments, any client-specific arguments included in the request would be intended for (and formatted for) the client-specified endpoint and/or service rather than for the default endpoint and/or service (e.g., they would comply with the API for the preferred service, rather than an API for the default service, assuming the APIs for the preferred service and the default service are different).

Figure 3:
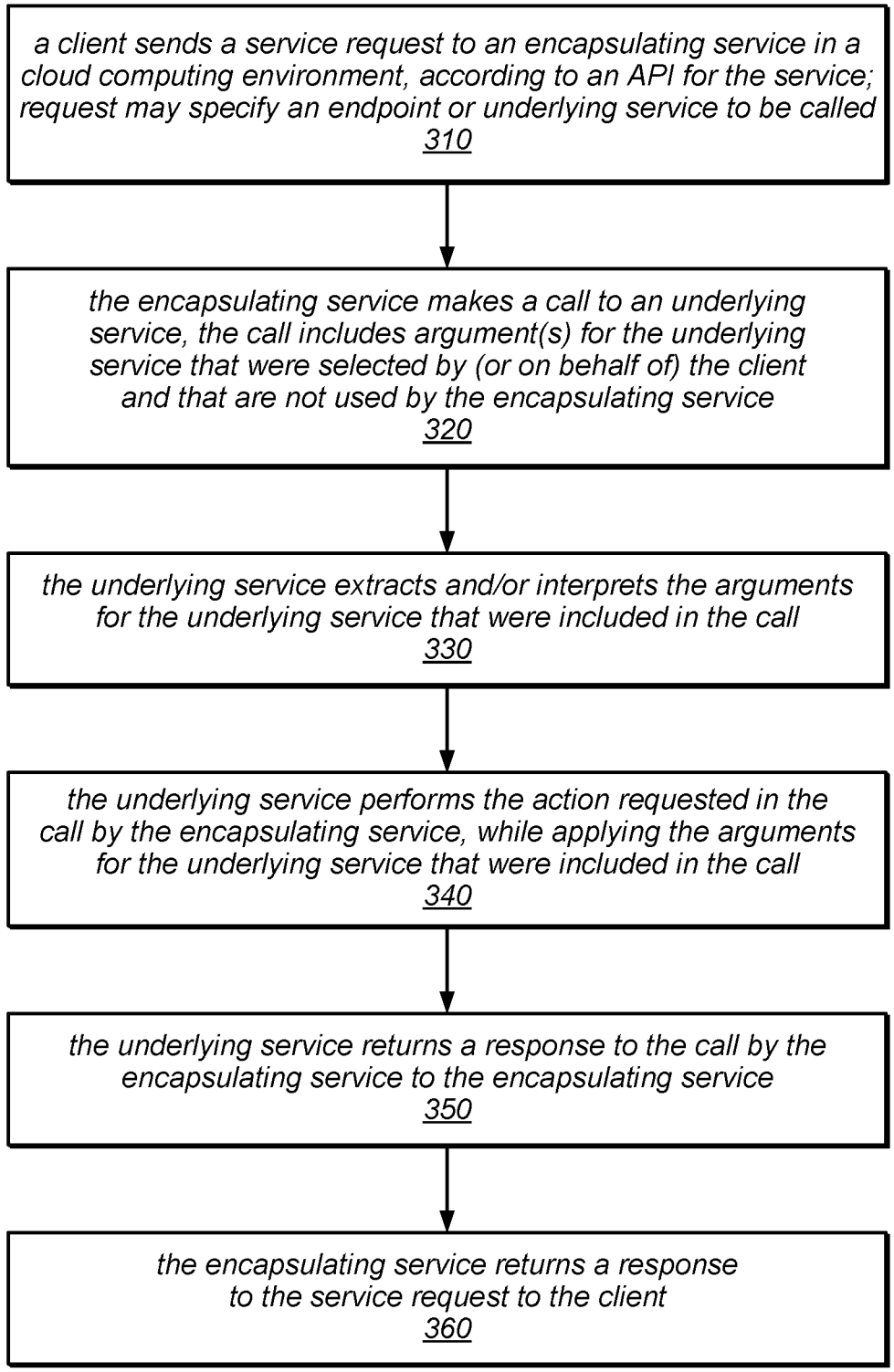
FIG. 3 is a flow diagram illustrating one embodiment of a method for delegating parameters of encapsulated services.

One embodiment of a method for delegating parameters of encapsulated services is illustrated by the flow diagram in FIG. 3. As illustrated at 310, in this example, the method may include a client sending a service request to an encapsulating service in a cloud computing environment, according to an API for the service. As described above, in some embodiments the service request may (optionally) include information specifying an endpoint to which a call to an underlying service should be directed and/or a particular underlying service to be called by the encapsulating service, which may override a default endpoint or service that would otherwise have been called by the encapsulating service. The method may also include the encapsulating service making a call to an underlying service (e.g., one selected according to information included in the service request by the client, or one selected by the encapsulating service by default or according to any applicable policy), and the call to the underlying service may include one or more arguments for the underlying service that were selected by (or on behalf of)

the client and that are not used by the encapsulating service (as in 320). For example, the call to the underlying service may include one or more arguments specifying service parameter values of the underlying service that are not interpreted by the encapsulating service and may not even be visible, readable (e.g., able to be parsed), or understandable to the encapsulating service.

As illustrated in this example, the method may include the underlying service extracting and/or interpreting the arguments for the underlying service that were included in the call (as in 330), and the underlying service performing the action requested in the call by the encapsulating service, while applying the arguments for the underlying service that were included in the call (as in 340). In some embodiments, the method may include the underlying service returning a response to the call by the encapsulating service to the encapsulating service (as in 350), and the encapsulating service returning a response to the service request to the client (as in 360). For example, the underlying service may return an error indication to the encapsulating service (e.g., "invalid argument for service Y") in response to receiving one or more client-specified arguments that are invalid or in response to receiving an invalid combination of default, policy-based, and/or client-specified arguments, and the encapsulating service may proxy that error indication through itself to the client.

In some embodiments, a parameter delegation mechanism employed in the service provider systems described herein may include the use of a designated field within the service request calls made to encapsulated services by encapsulating services. This designated field may include one or more dictionaries of key-value pairs (e.g., key-value pairs specified by the client for use as arguments of an encapsulated service) that would be uninterpreted in the service request calls received by the encapsulating services from the client (e.g., they may be treated as text rather than as input parameters of the encapsulating service), but would be recognized and interpreted and used (as appropriate) by the encapsulated services when blindly passed to them by the encapsulating services. In some embodiments, an encapsulating service may support service requests of one type, while an encapsulated service that is called by the encapsulating service may support service requests of a different type. For example, an encapsulating service may support REST-style service requests, while an underlying service may support SOAP-based service requests, or vice versa. In such embodiments, the encapsulating service may not be able to understand or even parse arguments for the underlying service that are specified by a client or by an applicable policy, but may be configured (e.g., using one or more of the parameter delegation or proxying mechanisms described herein) to pass uninterpreted arguments intended for the underlying service to the underlying service within a service request call (e.g., as a string of fixed length or an opaque data block within a designated field of the service request, or in a data structure of a different type within a designated field of the service request). The underlying service may then unpack, parse, or otherwise extract these arguments from the service request that is received from the encapsulating service in order to interpret and apply them.

Figure 4:
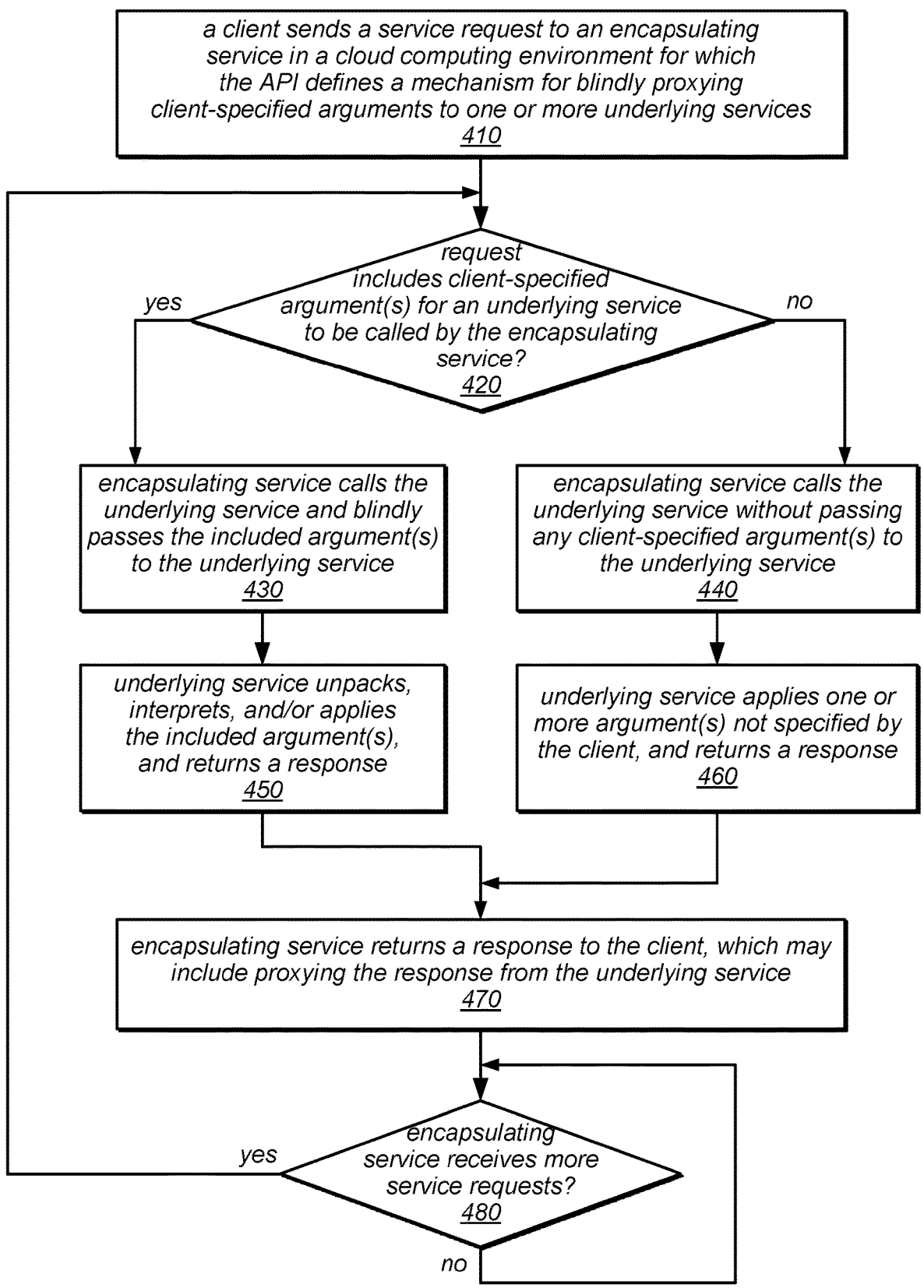
FIG. 4 is a flow diagram illustrating one embodiment of a method for an encapsulating service to blindly pass arguments received in a service request call to an underlying service.

One embodiment of a method for an encapsulating service to blindly pass arguments received in a service request call to an underlying service is illustrated by the flow diagram in FIG. 4. As illustrated at 410, in this example, the method may include a client sending a service request to an encapsulating service in a cloud computing environment for which the API defines a mechanism for blindly proxying client-specified arguments to one or more underlying services (e.g., arguments specifying service parameter values for the underlying services). If the service request includes one or more client-specified arguments for an underlying service to be called by the encapsulating service (shown as the positive exit from 420), the method may include the encapsulating service calling the appropriate underlying service and blindly passing the included argument(s) to the underlying service, as in 430. For example, the service request call may include arguments passed as (or within) an uninterpreted dictionary (in a field within the request designated for such dictionaries) that comprises one or more key-value pairs specific to the underlying service, arguments passed as (or within) an opaque (e.g., differently formatted, packed, and/or encrypted) block to be subsequently unpacked, parsed, and/or decrypted by the underlying service, or arguments passed as (or within) header information formatted in accordance with a header format that is designated for arguments of encapsulated services.

As illustrated in this example, the method may then include the underlying service unpacking, interpreting, and/or applying the included argument(s), e.g., as part of fulfilling (or at least attempting to fulfill) the service request, and returning a response to the encapsulating service (as in 450). Note that some of the included arguments may be applicable for use by (and passed to) more than one encapsulated service, e.g., two different encapsulated services that are called separately by the encapsulating service. In some embodiments, one or more of the included arguments may be applicable for use by multiple encapsulated services that are invoked through a chain service request calls, in which case they (or, alternatively, all of the arguments initially passed to an encapsulating service) may be passed to each successive encapsulated service in the call chain in the same manner or using one or more different parameter delegate mechanisms, and each of the encapsulated services may unpack, extract, interpret and/or apply those arguments that are applicable in fulfilling the service request calls in which they were received. Note also that, in various embodiments, any given service request call made to an encapsulated by an encapsulating service may be fulfilled by the encapsulated service by applying a combination of default arguments and/or policy-based arguments, some of which may be overridden by the arguments passed to it by the encapsulating service.

On the other hand, if the service request does not include any client-specified arguments for an underlying service to be called by the encapsulating service (shown as the negative exit from 420), the method may include the encapsulating service calling the underlying services without passing any client-specified argument(s) to the underlying service (as in 440). In some embodiments, the service request call made to the underlying service by the encapsulating service may not include any arguments that are specific to the encapsulated service or may include a combination of default arguments and/or policy-based arguments to be interpreted and applied by the encapsulated service. For example, the encapsulating service may maintain default or policy-based arguments in a table, file, or other data structure, which may have been specified on a per customer or client basis prior to receiving the service request, and which may be selected or defined by the customer or client, may be based on history of previous requests, or may be selected or defined by the customer or client as default arguments for use by a particular encapsulated service or for a particular combination of encapsulated services (e.g., dependent on what the encapsulating service(s) are in a chain of called services).

In other embodiments, the service request call made to the underlying service by the encapsulating service may not include any arguments that are specific to the encapsulated service, and the encapsulated service may apply a combination of default arguments and/or policy-based arguments in fulfilling the service request it receives from the encapsulating service. In some embodiments, the encapsulated service may maintain default or policy-based arguments in a table, file, or other data structure, which may have been specified on a per customer or client basis prior to receiving the service request, and which may be selected or defined by the customer or client, may be based on history of previous requests, or may be selected or defined by the customer or client as default arguments for use by a particular encapsulated service or for a particular combination of encapsulated services (e.g., dependent on what the encapsulating service(s) are in a chain of called services). In any of these cases, the method may include the underlying service applying one or more arguments that were not specified by the client (e.g., any suitable combination of default arguments and/or policy-based arguments) as part of fulfilling (or at least attempting to fulfill) the service request, and returning a response to the encapsulating service, as in 460).

As illustrated in this example, regardless of whether or not the service request includes any client-specified arguments for an underlying service to be called by the encapsulating service, the method may include the encapsulating service returning a response to the client, which may include proxying the response (or at least a portion thereof) that it received from the underlying service (as in 470). If and when the encapsulating service receives more service requests (shown as the positive exit from 480), the method may include repeat the operations illustrated in 420-470 for each additional service request received by the encapsulating service. This illustrated in FIG. 4 by the feedback from the positive exit of 480 to 420. Otherwise (shown as the negative exit from 480), the encapsulating service may take no other action on behalf of the client until and unless additional service requests are received from the client In some embodiments in which policy-based arguments are used by encapsulated services to fulfill (or at least attempt to fulfill) service requests received from encapsulating services, a customer or client may register a policy with the encapsulated service or may register a policy with a central service that provides this functionality to encapsulated services. For example, an encapsulated service, when invoked by a service request call made by encapsulating service, may access the registered policy or query the central service to obtain default arguments and/or situation-specific arguments that, according to one or more applicable policies, are to be used by the encapsulated service (e.g., to provide any input parameters that were not specified in the service request call) when the particular encapsulating service call the encapsulated service on behalf of the customer/client. Alternatively, an encapsulating service, when invoking an encapsulated service, may access the registered policy or query the central service to obtain default arguments and/or situation-specific arguments that, according to one or more applicable policies, are to be used by the encapsulated service (e.g., to provide any input parameters that were not specified in the service request call) when the particular encapsulating service call the encapsulated service on behalf of the customer/client, and may include those in the service request call made to the encapsulated service, in some embodiments.

In a specific example, a client may register a policy with a key-durable storage service (such as key-durable storage service 210 in FIG. 2) or a block storage service (such as block storage service 240 in FIG. 2) and/or with a central service that provides this functionality specifying that all snapshots created by the block storage service and stored in the key-durable storage service on behalf of the client should be stored using reduced redundancy storage or specifying that a server-side encryption feature of the key-durable storage service should be enabled for the snapshots. In such embodiments, when and if the block storage service calls the key-durable storage service to store a snapshot on behalf of the client, the block storage service may obtain these arguments from its registered policy information or from the central service and pass them to the key-durable storage service or the key-durable storage service may obtain these arguments from its registered policy information or from the central service in response to receiving a service request call from the block storage service, after which the key-durable storage service may apply them when storing the snapshot on behalf of the client.

In some embodiments, in situations in which no applicable policy is registered with an encapsulated service or a central service that provides this functionality (e.g., none that specifies arguments for use in the particular circumstances under which a call is made to the encapsulated service), the encapsulated service may be configured to apply default arguments in fulfilling (or at least attempting to fulfill) the service request (e.g., system-wide defaults for the arguments of the encapsulated service. Note that the use of such registered policies and/or central services for providing arguments based on registered policies may be useful for tracking (or auditing) compliance with regulatory or contractual obligations (e.g., those related to privacy, security, and/or data retention) in that they may codify the arguments specifying parameters relevant to those regulatory or contractual obligations (e.g., encryption options or retention policies, among others) that are (and/or that have been) applied in particular situations on behalf of particular customers or clients.

Figure 5:
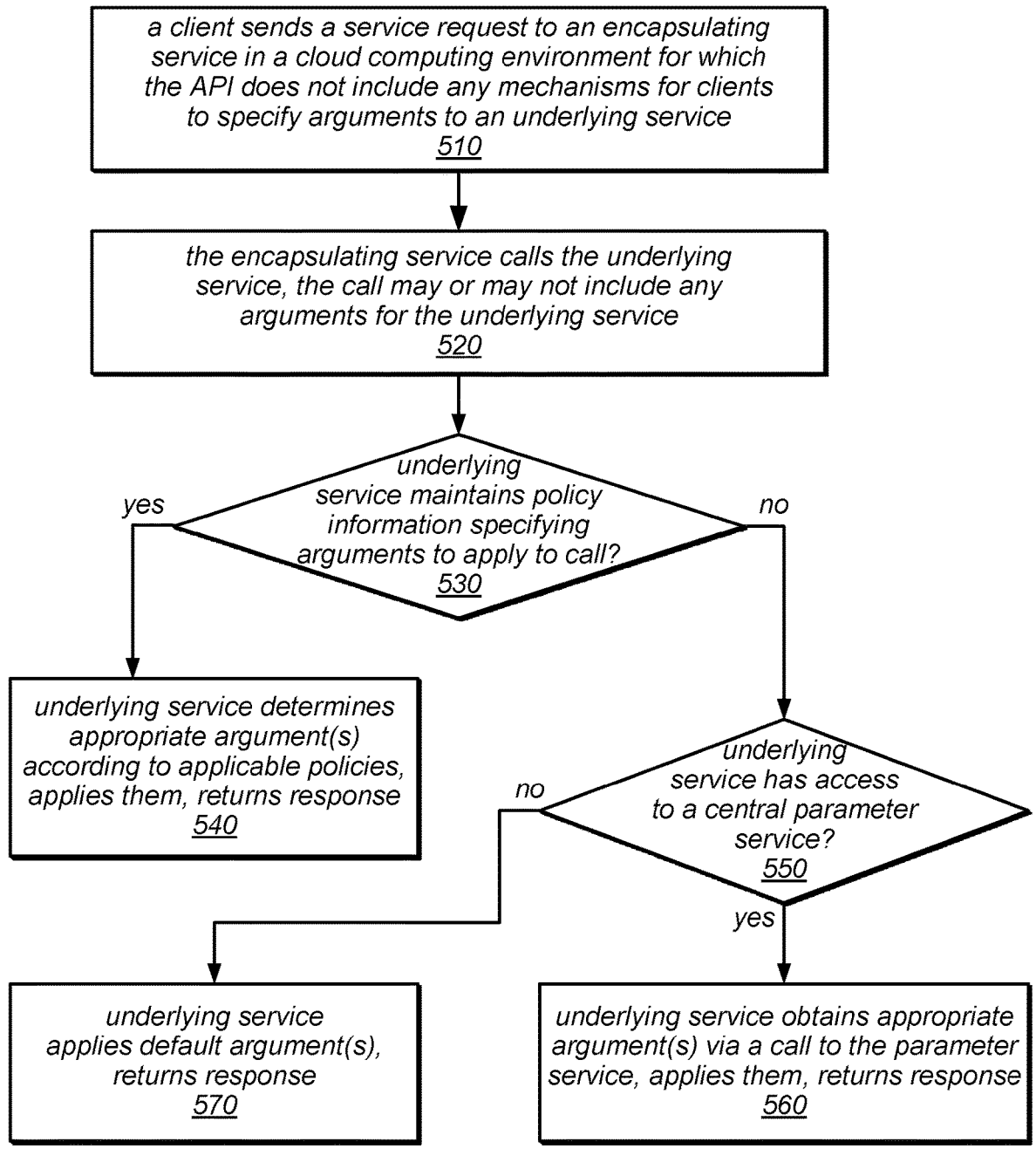
FIG. 5 is a flow diagram illustrating one embodiment of a method for selecting or obtaining arguments for an underlying service that are not defined by the API of an encapsulating service.

One embodiment of a method for selecting or obtaining arguments for an underlying service that are not defined or interpreted by the API of an encapsulating service is illustrated by the flow diagram in FIG. 5. As illustrated at 510, in this example, the method may include a client sending a service request to an encapsulating service in a cloud computing environment for which the API does not include any mechanisms for clients to specify arguments to an underlying service. In other words, the API of the encapsulating service may not be configured to view, parse, interpret or understand arguments specifying service parameter values for the underlying service. In this example, the method may include the encapsulating service calling the underlying service, and the call may or may not include any arguments for the underlying service, as in 520. For example, the encapsulating service may not include any arguments that are specific to the encapsulated service in the call or may include in the call a combination of default arguments and/or policy-based arguments to be interpreted and applied by the encapsulated service, in different embodiments.

As illustrated in FIG. 5, if the underlying service maintains policy information specifying arguments to be apply to the service request call (shown as the positive exit from 530), the method may include the underlying service determining one or more appropriate arguments to be used in fulfilling (or at least attempting to fulfill) the service request received from the encapsulating service, according to one or more applicable policies, applying those arguments, and returning a response to the encapsulating service (as in 540). For example, in various embodiments, the underlying service may access a registered policy (in a table, file, or other data structure in which is stores such policy information) or may query a central service to obtain default arguments and/or situation-specific arguments that, according to one or more applicable policies, are to be used by the encapsulated service in fulfilling (or at least attempting to fulfill) the service request.

As illustrated in this example, if the underlying service does not maintain policy information specifying arguments to apply to the service request call (shown as the negative exit from 530), but if the underlying service has access to a central parameter service (shown as the positive exit from 550), the method may include the underlying service obtaining one or more appropriate arguments to be applied to the service request call via a call to the parameter service, applying those arguments in fulfilling (or at least attempting to fulfill) the service request received from the encapsulating service, and returning a response to the encapsulating service (as in 560). Otherwise, the method may include the underlying service applying one or more default arguments in fulfilling (or at least attempting to fulfill) the service request received from the encapsulating service, and returning a response to the encapsulating service (as in 570). Note that in various embodiments, such a central parameter service may or may not be provided by the same service provider that provides the encapsulating service and/or the encapsulated service (e.g., it may be an externally sourced service to which the encapsulating service and/or the encapsulated service, among other services provided by the same service provider subscribe).

As previously noted, in some embodiments, in order to support the parameter delegation techniques described herein (e.g., the ability to pass arguments through encapsulating services to underlying services or otherwise delegate parameters of encapsulated services to other sources), the encapsulating services may need to be configured to support one or more parameter delegation mechanisms, including, but not limited to, those described herein. For example, an encapsulating service may be modified or configured to include in its service request calls a dictionary field into which one or more uninterpreted dictionaries of key-value pairs representing the arguments of various encapsulated may be inserted by a client, to define a header format to be used when including arguments within header information in its service request calls, or to include a designated format or field for one or more opaque blocks containing arguments included in its service request calls, in different embodiments. In another example, an encapsulating service may be modified or configured to maintain and/or access registered policies or to query a central parameter service to obtain arguments and to subsequently include them in service request calls made to encapsulated services. In yet another example, an encapsulating service may be modified or configured to proxy (e.g., to blindly pass) responses it receives from an encapsulated service through itself and back to the client that called the encapsulating service.

As described herein, once an encapsulating services has been configured to support one or more parameter delegation mechanisms, it may not need to be further modified to support parameter delegation for more, fewer, or different encapsulated services or to support more, fewer, different, or modified features and functions of those encapsulated services (or their corresponding APIs).

Note that in service provider systems that support the parameter delegation techniques described herein, the encapsulated services may need to be configured to make use of the parameters that are passed to it by an encapsulating service or by a central parameter service. For example, in embodiments in which arguments are passed to an encapsulated service within a service request call received from an encapsulating service (e.g., within a dictionary of key-value pairs, header information, or an opaque block), the encapsulated service may need to be configured to decrypt, unpack, or otherwise extract those arguments in order to interpret and apply them. In some embodiments, this may include stripping a header information prefix that was defined for the use of the parameter delegation techniques described herein from any header information that includes this prefix. For example, if the designated header format for this use case includes a prefix such as "x-serviceName", this prefix may stripped from any header information of the format "x-serviceName-someHeader" by the encapsulated service identified by the "serviceName" portion of the entry to obtain the arguments to be interpreted and applied by the encapsulated service (e.g., arguments found within the "someHeader" portion of the entry).

Note that although no changes may need to be made to encapsulating services to support more, fewer, different, or modified features and functions of those encapsulated services (or their corresponding APIs) subsequent to configuring the encapsulating services to support the parameter delegation techniques described herein, in some embodiments, the service provider may be configured to publish or otherwise present information to customers and/or clients indicating any features and/or functions of various encapsulated services that are added, removed, or modified for which such parameter delegation is supported. The information published or presented may include information about how to use the parameter delegation techniques described herein to take advantage of those features or function. For example, it may describe default and/or policy-based arguments for those features or functions, or may specify which (if any) of the parameters of those features or functions can be specified by the client (e.g., to override any default or policy-based arguments) and/or how the client may specify those parameters, e.g., by including them in a dictionary of key-value pairs, header information, or an opaque block within a service request call or by registering various policies with the service provider (or specific services thereof) or a central parameter service. Clients may then choose whether or not to take advantage of the opportunity to specify those arguments for which client specification is supported by the service provider, based on the published or presented information and/or on the client's requirements or preferences.

Figure 6:
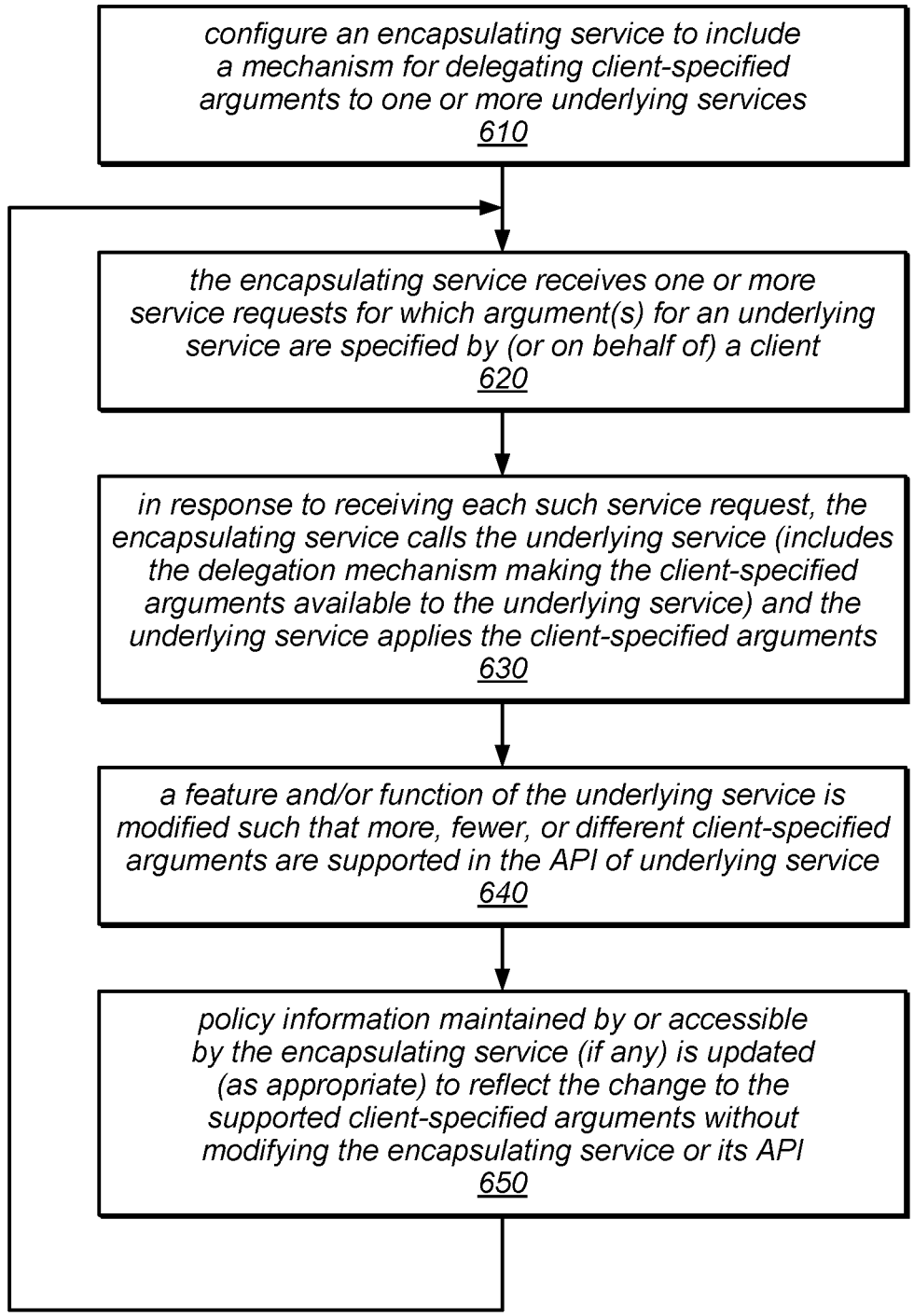
FIG. 6 is a flow diagram illustrating one embodiment of a method for configuring and employing a mechanism for delegating client-specified arguments to one or more underlying services.

One embodiment of a method for configuring and employing a mechanism for delegating client-specified arguments to one or more underlying services is illustrated by the flow diagram in FIG. 6. As illustrated at 610, in this example, the method may include configuring an encapsulating service to include a mechanism for delegating client-specified arguments (e.g., one or more arguments specifying service parameter values) to one or more underlying services. For example, a one-time modification or configuration operation may be applied to the encapsulating service in order to allow various features and/or options of the encapsulated services that it calls (or that it may subsequently be configured to call) to be exposed to (and/or selected or configured by) clients using one or more of the parameter delegation mechanisms described herein.

As illustrated in this example, the method may include the encapsulating service receiving one or more service requests for which one or more arguments for an underlying service are specified by or on behalf of a client, e.g., within the service request or through stored or otherwise obtained policy information as in 620. The method may include, in response to receiving each such service request, the encapsulating service calling the underlying service (which may include passing the client-specified arguments to the underlying service) and the underlying service applying the client-specified arguments (e.g., those passed to it by the encapsulating service) in fulfilling (or at least attempting to fulfill) the service request, as in 630.

As illustrated in FIG. 6, at some point a feature and/or function of the underlying service may be modified such that more, fewer, or different client-specified arguments are supported in the API of underlying service (as in 640). In response to such a modification, the method may include updating any policy information maintained by or accessible by the encapsulating service (as appropriate) to reflect the change to the supported client-specified arguments without modifying the encapsulating service itself or its API (as in 650). In some embodiments, no changes may be required in the encapsulating service or its API in response to a change in the API of the underlying service. For example, in embodiments in which the mechanism for delegating parameters to underlying services relies on opaque blocks, header information, and/or uninterpreted key-value dictionaries being embedded in the service request calls of the encapsulating service, only the data within such opaque blocks, header information, and or key-value dictionaries may need to be modified in response to a change in the underlying service and/or its API.

Similarly, in embodiments in which the mechanism for delegating parameters to underlying services relies on stored policies or policy-based criteria, only the policy information may need to be updated in response to a change in the underlying service and/or its API, but the API for the encapsulating service may not need to change in order to support the change to the underlying service. As illustrated in this example, subsequent to the modification to the underlying service and/or its API, the method may include repeating the operations illustrated in 620-630 when and if the encapsulating service receives additional service requests (e.g., service requests that include arguments for the underlying service according to the modifications made to the service and/or its API). In addition, the method may include repeating the operations illustrated at 650 in response to a further modification being made to the underlying service and/or its API (as in 640). This is illustrated in FIG. 6 by the feedback from 650 to 620.

In some embodiments, an encapsulating service may call another service, which may act as an encapsulating service (calling yet another service), and so on, forming a call chain in which multiple services may act both as an encapsulating service and as an encapsulated service, as different times. In such embodiments, the parameter delegation techniques described herein may allow the multiple services in the call chain to proxy arguments for one or more services further down the chain, each of which may extract the particular arguments that are applicable to that service (e.g., by extracting various key-value pairs within an uninterpreted dictionary, an opaque block, or header information that is passed from service to service along the calling chain).

In some embodiments, the parameter delegation techniques described herein may provide access to at least some features or functions of the services provided by a service provider to an external (e.g., third party) service. For example, the external service may act as an encapsulating service in calling a service provided by the service provider and including in the service request call one or more arguments for the called service (e.g., within an uninterpreted dictionary, an opaque block, or header information). Such parameter delegation may only be supported for particular ones of the arguments of the called service and only when and if the external service is authorized to specify those arguments. in some embodiments, this approach may allow a third party service provider to combine functions and features offered by the service provider with their own services and to configure at least some of the functions and features offered by the service provider to meet the requirements of the combined service.

Figure 7:
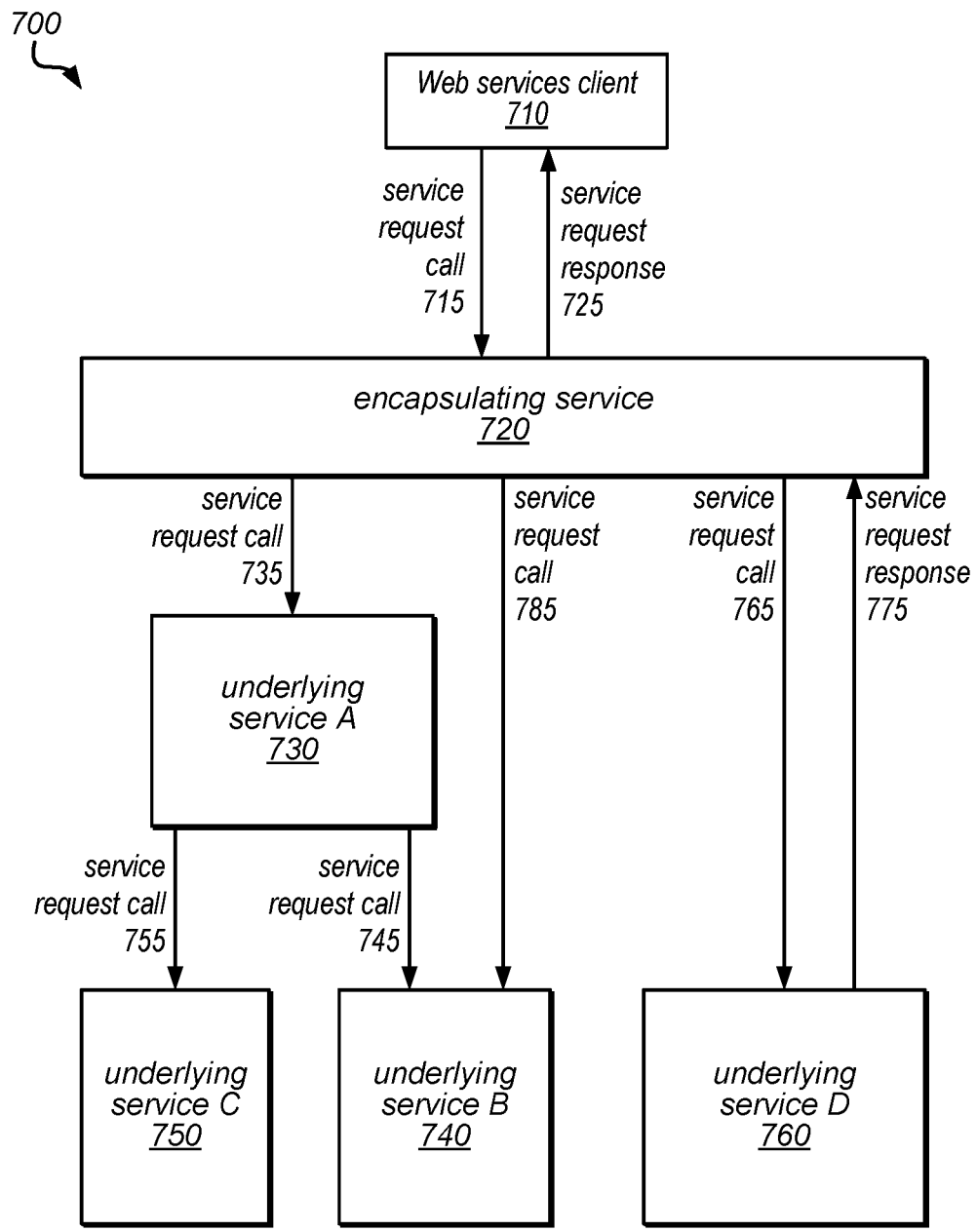
FIG. 7 is a block diagram illustrating a service request call chain for an encapsulating service and multiple underlying services in a computing system that provides various Web-based services to clients, according to some embodiments.

FIG. 7 is a block diagram illustrating a service request call chain for an encapsulating service and multiple underlying services in a computing system that provides various Web-based services to clients, according to some embodiments. For example, in some embodiments, computing system 700 may implement a Web server, such as web services platform 200 illustrated in FIG. 2. In various embodiments, computer system 700 may be configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by computing system 700 in order to provide services requested by various clients. For example, in order to satisfy a service request directed to a data storage system, the data storage system may allocate one or more database connections, input/output channels, storage resource portions and/or other resources for each normalized, logical work unit or logical service request unit required to satisfy the request.

As illustrated in this example, computing system 700 may include an encapsulating service 720, i.e., a service that is configured to call one or more other services, as appropriate, in order to fulfill service requests from a Web services client 710. In some embodiments, encapsulating service 720 may utilize predefined instructions or communications, such as via defined application protocol interfaces (APIs), to communicate with Web services client 710 and/or other components of computing system 700 on behalf of Web services client 710.

In this example, encapsulating service 720 may be configured to receive a service request call 715 from Web services client 710. In some embodiments, the service request call may include arguments passed as (or within) an uninterpreted dictionary (in a field within the request designated for such dictionaries) that comprises one or more key-value pairs specific to the underlying service, arguments passed as (or within) an opaque (e.g., differently formatted, packed, and/or encrypted) block to be subsequently unpacked, parsed, and/or decrypted by the underlying service, or arguments passed as (or within) header information formatted in accordance with a header format that is designated for arguments of encapsulated services. In some embodiments, one or more arguments may be obtained by the encapsulating service 720 from registered policy information or from a central parameter service, as described herein. After fulfilling (or at least attempting to fulfill the request), the encapsulating service 720 may be configured to return a service request response 725 to the client, which may include an indication of the results of performing an action on behalf of Web services client 710, state information, an error indication, or any other suitable response. In order to attempt to fulfill the request, encapsulating service 720 may be configured to send a service request call 735 to an underlying service A 730, which in turn may also be an encapsulating service. For example, underlying service A 730 may be configured to call an underlying service C 750 (using service request call 755) and/or underlying service B 740 (using service request call 745) in order to fulfill service request call 735.

As illustrated in FIG. 7, encapsulating service 720 may also be configured to send a service request call 785 directly to underlying service B 740 and/or to send a service request call 765 to underlying service D 760. In this example, underlying service D 760 is configured to return a service request response 775, which may include an indication of the results of performing an action on behalf of Web services client 710, state information, an error indication, or any other suitable response. Note that while not illustrated in FIG. 7, any or all of the other underlying services called by encapsulating service 720 or underlying service A 730 (e.g., underlying service B 740 and/or underlying service C 750) may also be configured to return a service request response, in different embodiments.

As described herein, in some embodiments, in response to encapsulating service 720 receiving a service request call 715 from Web services client 710 that includes one or more arguments for one or more underlying services, those arguments may be passed along to the underlying services to which they are directed (e.g., either directly from encapsulating service 720 or through another encapsulating service, such as underlying service A 730) within service request calls (e.g., within service request call 735, service request call 745, service request call 755, service request call 765, or service request call 785) without being interpreted or applied by (or, in some cases, visible to) encapsulating service 720. For example, the service request calls may include arguments passed as (or within) an uninterpreted dictionary (in a field within the request designated for such dictionaries) that comprises one or more key-value pairs specific to the underlying service, arguments passed as (or within) an opaque (e.g., differently formatted, packed, and/or encrypted) block to be subsequently unpacked, parsed, and/or decrypted by the underlying service, or arguments passed as (or within) header information formatted in accordance with a header format that is designated for arguments of encapsulated services. In some embodiments, each of these service request calls may include a subset of the arguments that are included in service request call 715 that are to be unpacked, interpreted and/or applied by the particular underlying service to which it is directed. Note that some of the arguments may be applied by more than one of the underlying services (e.g., when and if those parameter values have meaning in those services).

Note that in various embodiments, the components illustrated in FIG. 7 may be implemented directly within computer hardware, as instructions directly or indirectly executable by computer hardware (e.g., a microprocessor or computer system), or as a combination of these techniques. For example, the components of the computing system 700 may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIG. 7.

Various techniques that may be implemented by a Web server (or an admission control subsystem or other component thereof) are described in more detail below, according to different embodiments. In general, any or all of the techniques described herein for managing the processing of service requests on behalf of clients may be performed by and/or implemented in an admission control module that is a component of a Web server. While several examples described herein are directed to systems that provide services over the Internet, in other embodiments, these techniques may be performed by and/or implemented in a similar component of another type of system that provides services to clients, and that is configured to receive, accept, and/or service requests on behalf of those clients.

Figure 8:
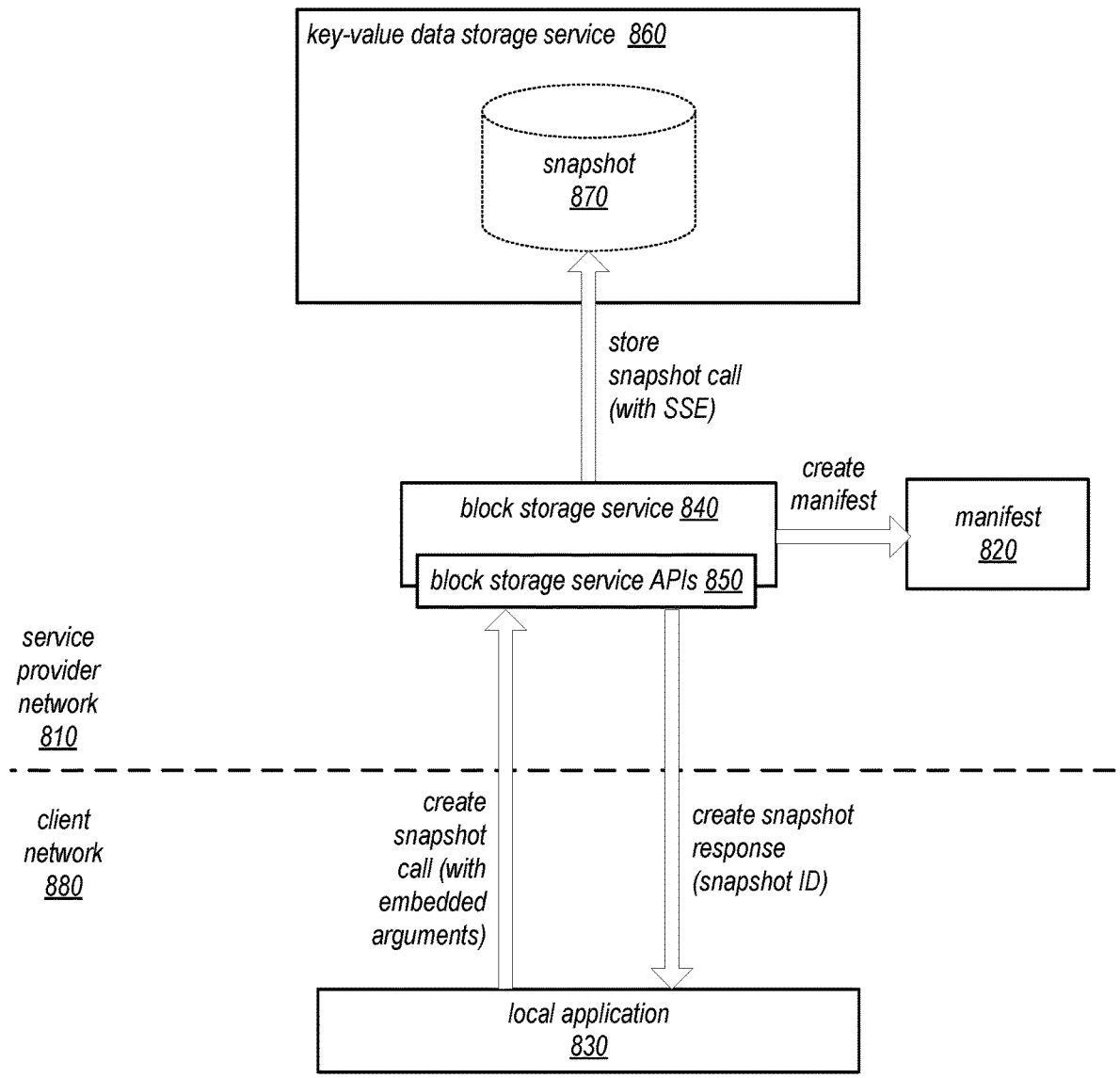
FIG. 8 is a block diagram illustrating a system in which an encapsulating block storage service calls a key-value data storage service, according to various embodiments.

FIG. 8 is a block diagram illustrating a system in which an encapsulating block storage service calls a key-value data storage service, according to various embodiments. More specifically, FIG. 8 is a high-level block diagram that illustrates the use of these techniques when creating a snapshot via a "create snapshot" API, according to at least some embodiments. A create snapshot API may be provided that allows a caller to request creation of a snapshot of an existing volume on a remote data store, or alternatively to request creation of a snapshot for an existing volume on a service client's local data store. In the example illustrated in FIG. 8, a local application 830 on a client network 880 may make a create snapshot call to a block storage service 840 (according to one or more APIs 850 of block storage service 840 on service provider network 810). The call may include several input parameters (e.g., parameters of block storage service 840 or any of its components). In this example, the create snapshot service request call sent to block storage service 840 by local application 830 may include one or more arguments that are directed to an underlying key-value data storage service 860 (which implements key-value durable storage), but that are not interpreted or applied by (and may not even be visible to) block storage service 840. For example, the service request call received from local applications 830 may include arguments for the encapsulated service (e.g., as header information, or as an opaque block or uninterpreted key-value dictionary) and may call encapsulated key-value data storage service 860, blindly passing along those arguments.

In some embodiments, the block storage service APIs 850 and/or block storage service 840 may check one or more parameters of the create snapshot call to determine if the call is valid. If the call is not valid for some reason, an indication of the problem may be returned to the local application 830. If the call is valid, then the block storage service 840 may create a new snapshot 870. The block storage service 840 may then make a service request call to the underlying key-value data storage service 860 (which implements key-value durable storage) to store snapshot 870 on behalf of the client according to the input parameters. As illustrated in this example, the service request call to key-value data storage service 860 may include an argument that was passed through the block storage service API of block storage service 840 (e.g., without being interpreted or applied) indicating that the snapshot 870 should be stored by key-value data storage service 860 using server-side encryption (SSE).

In at least some embodiments, a manifest 820 may be created for the snapshot 870. For example, manifest 820 may be used by the block storage service 840 to track the volume data and snapshot data of the service clients on the remote data store. In some embodiments, a response to the create snapshot call may be returned to the local application 830 according to the block storage service APIs 850 that indicates at least the snapshot identifier (snapshot ID) of the snapshot 870. After the snapshot is created, data may be uploaded to the snapshot 870, e.g., from a volume on a local data store on client network 880 (not shown).

Note that, in some embodiments, a client may be configured to apply the parameter delegation technique described herein on the client side. For example, in embodiments in which the parameter delegation mechanism includes a dictionary of key-value pairs for the parameters of an encapsulated service for which client specification is supported, the client may impose a guideline or rule on itself such that whenever it calls an encapsulating service that it knows will call a particular encapsulated service, the client may include in the service request call to the encapsulating service one or more key-value pairs, each of which will override a matching key-value pair that is defined in that dictionary.

As previously noted, not all input parameters for all features and functions of an encapsulated service may be able to be specified (or overridden) by clients using the parameter delegation techniques describe herein. For example, there may features and functions of an encapsulated service that the service provider does not wish to reveal or expose to clients in this way. In some embodiments, the service provider may maintain a table, list, or file indicating which (if any) of the input parameters may always be specified by clients, may never be specified by clients, or may be specified by clients only under particular conditions or according to one or more registered policies and/or when it is explicitly authorized by the service provider. In one example, a storage service client may be able to specify an argument for an "encryption type" parameter and/or for a "storage class" parameter, but may not be able to specify an argument for "destination bucket" for a storage operation that is invoked on the client's behalf by an encapsulating service. In some embodiments, the service provider may support customer-supplied keys (e.g., a dictionary of customer-supplied key-value pairs) that are associated with a particular virtualized resource instance, and that can be interpreted only by an encapsulated service that is external to the service provider of the encapsulating service and that is authorized to access the particular virtualized resource instance.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of various servers and other components that implement the service provider systems described herein).

Figure 9:
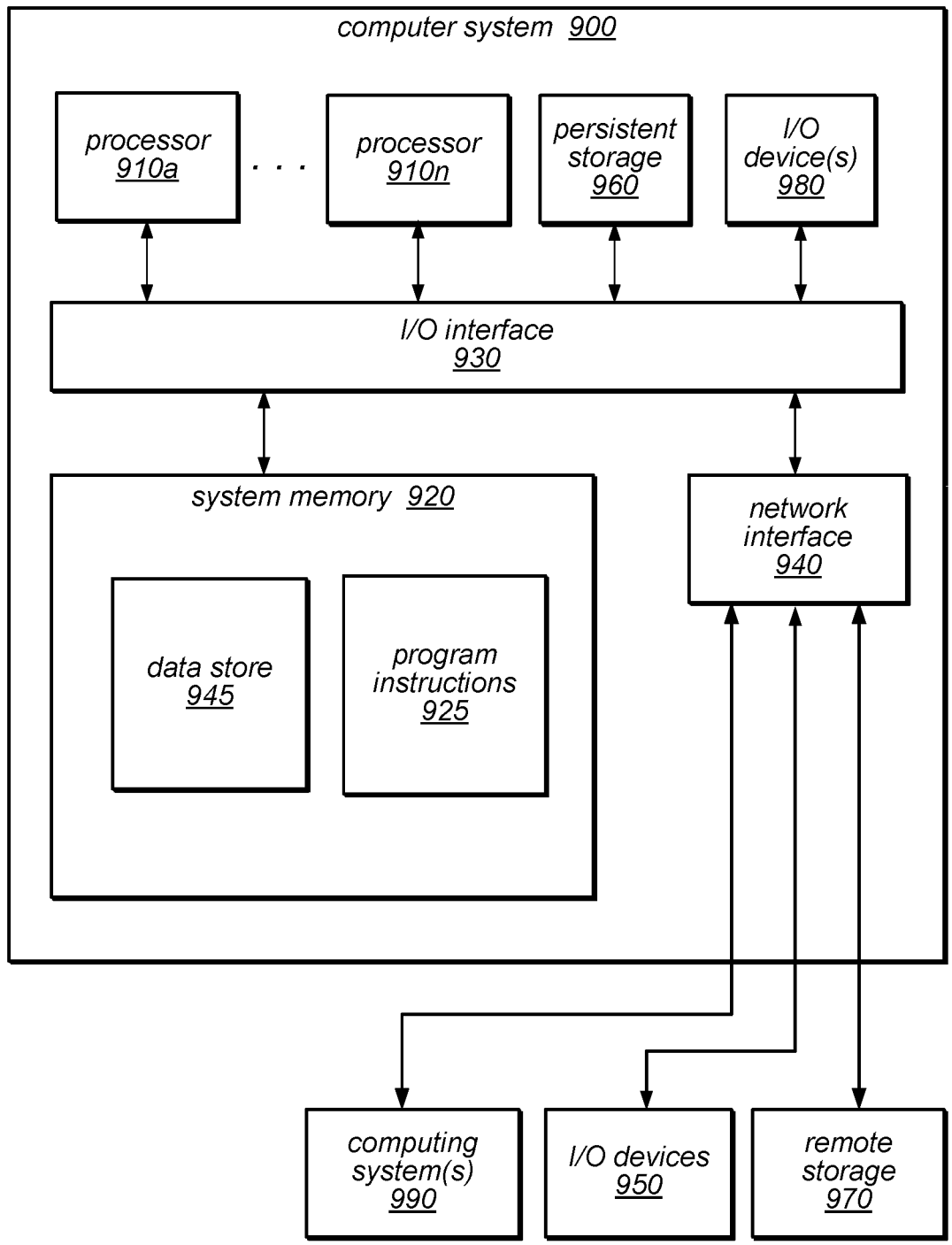
FIG. 9 is a block diagram illustrating a computer system configured to implement at least a portion of the techniques described herein for delegating parameters of encapsulated services, according to various embodiments.

FIG. 9 is a block diagram illustrating a computer system 900 that is configured to implement at least a portion of the techniques described herein for delegating parameters of encapsulated services, according to various embodiments. Computer system 900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 900 includes one or more processors 910 (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. The computer system 900 also includes one or more network communication devices (e.g., network interface 940) for communicating with other systems and/or components over a communications network (e.g. Internet, LAN, etc.). For example, a client application executing on system 900 may use network interface 940 to communicate with a server application executing on a single server or on a cluster of servers that implement a service provider system. In another example, an instance of a server application executing on computer system 900 may use network interface 940 to communicate with other instances of the server application that may be implemented on other computer systems.

In the illustrated embodiment, computer system 900 also includes one or more persistent storage devices 960 and/or one or more I/O devices 980. In various embodiments, persistent storage devices 960 may correspond to disk drives, tape drives, solid state memory, other mass storage devices, or any other persistent storage device. Computer system 900 (or an application or operating system operating thereon) may store instructions and/or data in persistent storage devices 960, as desired, and may retrieve the stored instruction and/or data as needed.

Computer system 900 includes one or more system memories 920 that are configured to store instructions and data accessible by processor 910. In various embodiments, system memories 920 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910 to implement the methods and techniques described herein. In various embodiments, program instructions 925 may be encoded in platform native binary, any interpreted language such as Java™ byte-code, or in any other language such as C/C++, Java™, etc., or in any combination thereof. For example, in the illustrated embodiment, program instructions 925 include program instructions executable to implement various encapsulating services, encapsulated services, parameter services, or any other component of a service provider system. In some embodiments, program instructions 925 may implement multiple separate clients, server nodes, and/or other components.

In some embodiments, program instructions 925 may include instructions executable to implement an operating system (not shown), which may be any of various operating systems, such as UNIX, LINUX, Solaris™, MacOS™, Windows™, etc. Any or all of program instructions 925 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include data store 945, which may be configured to store information used in performing the methods described herein. For example, registered policy information, client/customer preferences, and/or historical parameter usage data may be stored in data store 945 or in another portion of system memory 920 on one or more nodes, in persistent storage 960, and/or on one or more remote storage devices 970, in various embodiments. In some embodiments, and at various times, system memory 920 (e.g., data store 945 within system memory 920), persistent storage 960, and/or remote storage 970 may store primary or secondary copies of data begin stored on behalf of clients, metadata associated with that data and/or its state, default arguments for encapsulated services, dictionaries of key-value pairs representing input parameters of various services, policy information for encapsulated services, encapsulating services, and/or customers/clients, customer/client preferences and/or account information, service configuration information, and/or any other information usable in implementing the methods and techniques described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems 990 (which may implement one or more server nodes and/or clients of the service provider systems, for example). In addition, network interface 940 may be configured to allow communication between computer system 900 and various I/O devices 950 and/or remote storage 970. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the service provider systems described herein, or any of their components, may be implemented as one or more web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
performing, by one or more computing devices:
receiving, at a first service of a plurality of services from a client, a first service request according to an application programming interface (API) of the first service, the first service request including one or more input parameters for the first service defined by the API of the first service and a data block that is formatted to be uninterpretable by the first service, wherein the data block includes one or more arguments that are uninterpreted by an implementation of the API by the first service, and wherein the one or more arguments are to be sent to a second service; and
sending, from the first service to the second service of the plurality of services, a second service request including the one or more arguments according to an application programming interface (API) of the second service, wherein the one or more arguments are defined by the API of the second service.

2. The method of claim 1, further comprising:
receiving, at the second service, the second service request;
interpreting, by the second service, the one or more arguments that are defined by the API of the second service in the second service request according to the API of the second service; and
applying, by the second service, the one or more arguments in attempting to fulfill the second service request.

3. The method of claim 2, wherein the second service request comprises the data block.

4. The method of claim 3, wherein the data block comprises one or more additional arguments defined by an API of a third service, wherein the method further comprises:
sending, from the second service to the third service, a third service request including the one or more additional arguments according to the API of the third service.

5. The method of claim 1, wherein the one or more arguments are included in the first service request as an uninterpreted dictionary of key-value pairs in a field of the first service request designated for one or more uninterpreted dictionaries of key-value pairs.

6. The method of claim 1, further comprising interpreting, by the second service, the one or more arguments included in the second service request.

7. The method of claim 6, wherein interpreting the one or more arguments comprises unpacking or decrypting the data block.

8. The method of claim 1, further comprising:
receiving, at the first service from the second service, a response to the second service request; and
sending, from the first service to the client, a response to the first service request comprising at least a portion of the response to the second service request.

9. A system, comprising:
a plurality of computing nodes configured to provide a plurality of services, each of the computing nodes comprising one or more processors and a memory;
wherein the plurality of services comprises a first service and a second service, wherein the first service is configured to:
receive, from a client, a first service request according to an application programming interface (API) of the first service, the first service request including one or more input parameters for the first service and a data block that is formatted to be uninterpretable by the first service, wherein the data block includes one or more arguments that are uninterpreted by an implementation of the API by the first service, and wherein the one or more arguments are to be sent to the second service; and
send, from the first service to the second service, a second service request including the one or more arguments according to an application programming interface (API) of the second service, wherein the one or more arguments are defined by the second service.

10. The system of claim 9, wherein the second service is configured to:
receive the second service request;
interpret the one or more arguments that are defined by the API of the second service in the second service request according to the API of the second service; and
apply the one or more arguments in attempting to fulfill the second service request.

11. The system of claim 10, wherein the second service is further configured to send, to the first service, a response to the second service request.

12. The system of claim 11, wherein the first service is further configured to send, to the client, a response to the first service request comprising at least a portion of the response to the second service request.

13. The system of claim 9, wherein subsequent to a modification of the API of the second service, the first service is further configured to:
receive, from the client, a third service request including one or more other arguments to be sent to the second service, wherein the one or more other arguments are in accordance with the API of the second service;
send, from the first service to the second service, a fourth service request including the one or more other arguments according to the modified API of the second service.

14. The system of claim 13, wherein the second service is configured to:
receive the fourth service request;
interpret the one or more other arguments that are defined by the modified API of the second service in the fourth service request according to the API of the second service; and
apply the one or more other arguments in attempting to fulfill the fourth service request.

15. The system of claim 13, wherein the modification to the API of the second service comprises an addition of an argument for the second service, a deletion of an argument for the second service, or a modification of an argument for the second service due to an addition, deletion, or modification of a feature or function provided by the second service.

16. A non-transitory, computer-readable storage medium storing program instructions that, when executed on one or more processors, cause the one or more processors to perform:
  receiving, at a first service of the plurality of services from a client, a first service request according to an application programming interface (API) of the first service, the first service request including one or more input parameters for the first service and a data block that is formatted to be uninterpretable by the first service, wherein the data block includes one or more arguments that are uninterpreted by an implementation of the API by the first service, and wherein the one or more arguments are to be sent to a second service; and
  sending, from the first service to a second service of the plurality of services, a second service request including the one or more arguments according to an application programming interface (API) of the second service, wherein the one or more arguments are defined by the second service.

17. The non-transitory, computer-readable storage medium of claim 16, wherein the one or more arguments specify one or more of: a storage class, a processor class, a performance class, a redundancy option, a durability model, a consistency model, a throughput option, a security option, an encryption type, a data versioning option, a lifecycle parameter, a tenancy option, a locality policy, a retention policy, a load balancing policy, or a service level agreement parameter of the second service.

18. The non-transitory, computer-readable storage medium of claim 16, wherein the one or more arguments are included in the first service request as header information formatted in accordance with a header format that is designated for arguments of one or more other services.

19. The non-transitory, computer-readable storage medium of claim 16, wherein the instructions further cause the one or more processors to perform determining the one or more arguments that are defined by the API of the service based, at least in part, on a policy applicable to the first service request or the client.

20. The non-transitory, computer-readable storage medium of claim 16, wherein the second service is a storage service, and wherein the second service request comprises a request to store one or more items, retrieve one or more items from storage, list stored items, query the storage service for one or more stored items, modify one or more stored items, or delete one or more stored items.

* * * * *